May 12, 1953  M. L. STAFFORD  2,637,855
WASTE WATER UTILIZER FOR GARBAGE DISPOSALS
Filed Oct. 7, 1952
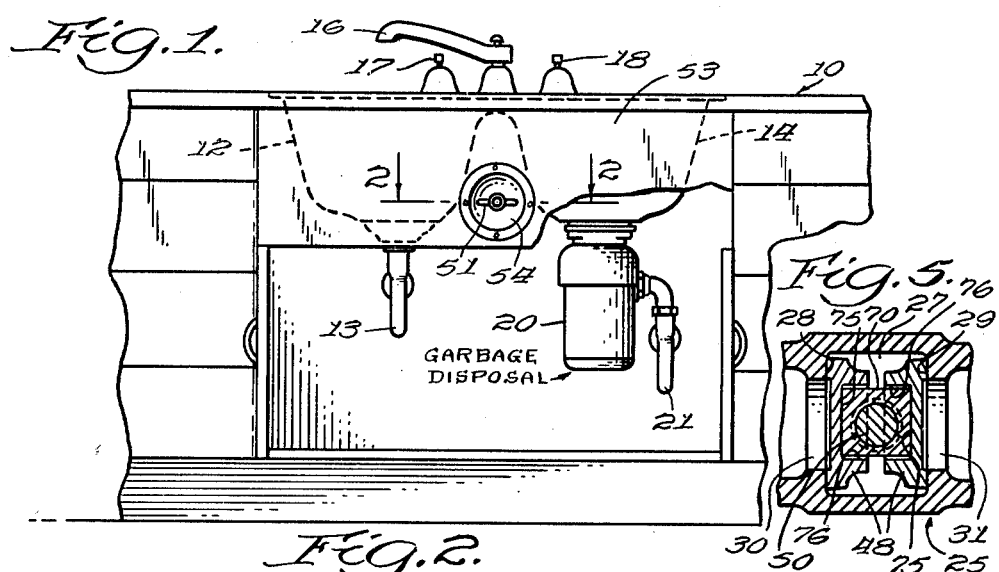
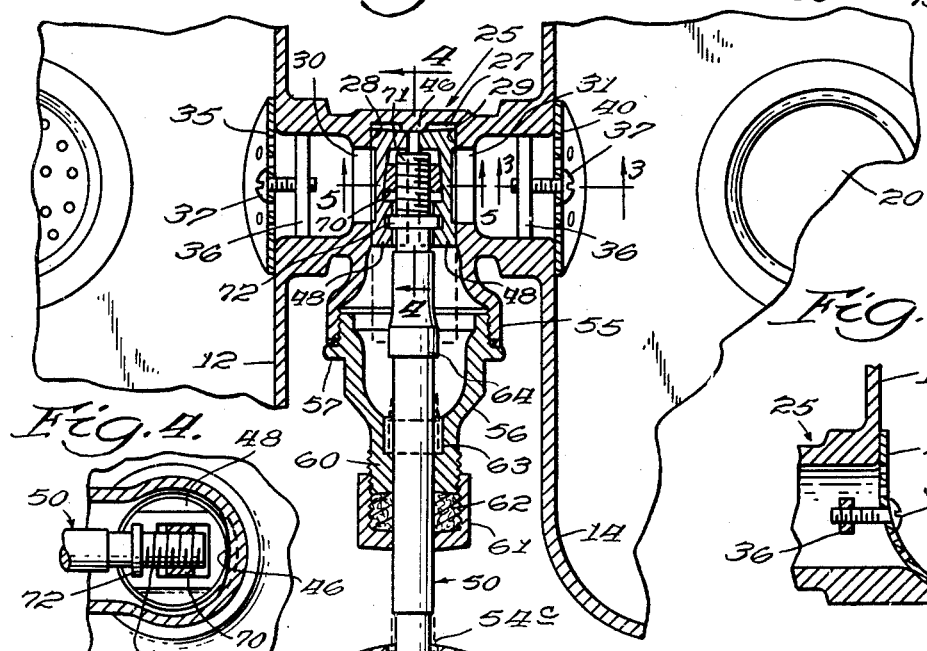
Inventor:
Martin L. Stafford Patented May 12, 1953

2,637,855

UNITED STATES PATENT OFFICE 2,637,855

WASTE WATER UTILIZER FOR GARBAGE DISPOSAL

Martin L. Stafford, Los Angeles, Calif., assignor of one-half to Josephine M. Reaume, Los Angeles, Calif.

Application October 7, 1952, Serial No. 313,433

7 Claims. (Cl. 4—187)

This invention relates to a device for utilizing waste water in the disposal of pulverized garbage.

During recent years many cities have found it to be necessary to go long distances to obtain an adequate water supply, aqueducts and expensive pipe lines many miles in length not infrequently being used in conducting the water from the source of supply to the metropolitan area where it is used. For this reason and also for reasons of personal financial economy, hereinafter pointed out, it has become increasingly important to economize water consumption for housekeeping purposes in order that the water thus economized may be made available for other uses.

Furthermore, it is not uncommon, particularly in large cities, for periods of water shortage for domestic use to occur, at which times it is important to use every available means for reducing the amount of water used in each kitchen and restaurant. And even when no water shortage is being experienced it is desirable that the metered water be reduced to the minimum necessary for financial economy.

Heretofore a considerable additional amount of metered water has been used in kitchens equipped with mechanical garbage disposal units, to flush out the garbage.

Accordingly, it is an object of this invention to utilize waste water in such a manner that the garbage may be flushed out without increasing the water bill of a person using a mechanical garbage disposal unit.

This invention is particularly intended to provide a valve controlled water passage means to conduct used dishwater to the garbage disposal passage or chamber of the garbage disposal unit, so that fresh tap water will not have to be used to flush out the ground up garbage to cause it to pass out through the trap into the sewer.

Furthermore, by providing a means to conduct hot used dishwater into the ground up garbage in the housing therefor, a more efficient flushing out of the garbage is obtained on account of the superior flushing quality of the hot dishwater. Therefore, by the use of this invention, not only is the quantity of cold water used lessened, but hot water is used in a more advantageous manner, without increasing the water heating bill.

The present invention further resides, in part, in the provision of an improved dual valve structure, in combination with the casing structure and water passage means associated therewith to conduct the used water from the part of the sink where it has been used to the compartment containing the ground up garbage.

The device is adapted to be used in all types of sinks equipped with garbage disposal units, whether such sinks are made of cast iron or other material so long as they are of the dual type.

The structure provided by this invention to afford liquid flow between the compartments of a double compartment sink is installable in any double compartment sink that has been properly drilled at the factory preparatory to such an installation. Machinery can also be designed to make it possible to install the valve controlled conduit means of the device in sinks already on the market, thus opening up a new, profitable line of business.

One of the advantages of this invention is that it provides a water economizing unit that can be installed in any approved type of vertical drain board, whether wooden or metallic.

An advantageous feature of the invention resides in the provision of a quick opening gate valve not encumbered with any compound leverage attachments for its operation. If the body of the valve is cast at the factory formation of the required openings between the two compartments can be a part of the molding operations.

Other objects, advantages and features of invention will hereinafter appear.

Referring to the accompanying drawing which illustrates a preferred embodiment of the invention, Fig. 1 is a front elevation of the device showing the same installed in a sink structure parts of which are broken away to contract the view and to disclose underlying structure.

Fig. 2 is an enlarged, horizontal section, the plane of section being indicated by line 2—2 on Fig. 1.

Figs. 3 and 4 are fragmentary vertical sections taken respectively on lines 3—3 and 4—4 of Fig. 2.

Fig. 5 is a transverse section on line 5—5 of Fig. 2.

Referring in detail to the drawing, therein is shown a built-in sink structure 10 comprising, in an adjacent relation to each other, two basins 12 and 14 and a horizontally swingable water supply spout 16. Said basin 12 is provided with a conventional trap 13 and will be used for dishwashing and in various other washing operations. The manually operable hot and cold water valves are respectively designated 17 and 18. Said basin 14 is shown furnished with a garbage disposal housing 20 into which the garbage deposited in said basin 14 passes to be ground up and then flushed out into the sewer through a trap 21.

By this invention a horizontal conduit means 25 is provided which affords liquid flow from the bottom portion of the basin 12 to the bottom portion of the basin 14, this conduit means having in its mid-length portion, a valve chamber 27 having vertical flat side walls 28 and 29, there being a circular inlet port 30 through said wall 28 and a circular outlet port 31 through said side wall 29. Both of said ports are in axial alinement with the conduit structure 25.

Where the conduit 25 communicates with the aforesaid basin 12 its intake end is guarded by a strainer plate 35 shown mounted upon a vertical bar 36 by means of a central screw 37, and at its outlet end said conduit is shown provided with a strainer plate 40 with like mounted means designated in the same manner.

In the drawing the bars 36, together with the entire conduit structure 25 and compartment sink structure are shown made in a single casting, but it is to be understood that the claimed invention is not limited to a construction of the unitary structure shown.

Sometimes the installation of a garbage disposal unit is not included in the part of building specifications relating to the kind of sink to be installed, but at a later time the owner of the building may desire to use the garbage disposal means in the manner provided by the present invention. With a view to this being possible, the manufacturer of the two-compartment sink may optionally prepare for the subsequent installation of the garbage disposal unit by providing each of the opposed wall portions of the two basins with an aperture positioned and dimensioned to have fitted into it the conduit structure 25. In such cases the manufacturer will close each of such openings with a suitably attached plate which may be of the same design as the aforesaid strainer plates 35 and 40, except that it will be of an imperforate character. It is important that the openings which are covered by said plates 35 and 40 be sufficiently large and directly face each other in the same horizontal plane, so that a quick transfer of the waste water from the basin 12 to 14 can be effected.

The aforesaid valve chamber 27 is provided along the midwidth of its back surface with a vertical rib 46 against the face of which abut the inner edge portions of the twin valve halves 48, presently described in detail. At each side of said rib said valve chamber has a circularly curved surface, as indicated by the broken line in Fig. 4.

The aforesaid twin valve halves 48, 48, are in a slidable, non-rotatable relation to the valve chamber 27 being operated by a manually operable stem 50 carrying at its outer end a winged handhold member 51 which is normally contained within an alcove 52 formed in the front wall 53 of the sink. As shown in the drawing, said alcove results from cutting a circular hole in the sink wall 53 and fitting into said hole a hemispherical plate 54 having a peripheral flange 54a around its mouth which is utilized to receive attaching screws 54b. Said plate 54 is provided with a central aperture 54c to accommodate the stem 50.

The casting which forms the aforesaid conduit 25 is provided in front with a horizontally projecting circular bonnet 55 the cylindrical outer end portion of which is internally screwthreaded. Into this bonnet is screwed the large end of a circular thimble 56 until a stop flange 57 carried by said thimble abuts the end of said bonnet. Said thimble has a tubular, externally screwthreaded, axial shank 60 upon which is screwed a packing nut 61 containing packing 62. The inner end of the thimble shank 60 is provided around the stem 50 with a stop forming annular recess 63 into which enters a diametrically enlarged part 64 of the stem 50 when the latter reaches the outer limit of its sliding movement.

Returning to the dual gate valve structure, each of the twin valve halves 48 loosely fits within the valve chamber 27, the walls of said chamber preventing rotation of these valve halves, but permitting them, at times, to be moved radially of the conduit 25 by means of the valve stem 50 to a position wherein they unobstruct free liquid flow through said valve chamber. When the valve is fully closed each of these halves firmly abuts the valve port (30 or 31), at its side of the valve chamber, having been forced to this position by means of a non-rotatable cam faced follower 70 which is substantially square in cross section and which has through it a screwthreaded axial bore operatively engaged by a screwthreaded end portion 71 of the stem 50. At the inner end of said screwthreaded portion the stem is provided integrally with a circumferential rib or collar 72 which turnably interengages at diametrically opposite sides with arcuate grooves formed internally in the adjacent end portions of the valve halves 48.

Each aforesaid valve half 48 is internally recessed as shown, thus providing it with an inner, flat, beveled surface portion 75 surrounded by a rectangular rim 76. Opposite side portions of said rim guide the aforesaid follower 70 in its back and forth movement when acted upon by the screwthreaded part 71 of the stem 50.

The dual valve structure and the operating means therefor which have been described cooperate well with the illustrated parallel valve seat surfaces which extend at right angles to the axis of the conduit 25 and which can be manufactured at a lower cost than would be required for converging valve seat surfaces or valve seat surfaces in a different angular relation to said conduit.

In operating the device, assuming the gate valve to be closed, the housewife will first use the winged member 51 to rotate the valve stem 50 in a counter-clockwise direction sufficiently to cause the threaded part 71 of said stem to retract the follower 70 a short distance, thus loosening the valve halves 48 from the valve seats which they abut. Then, by pulling outwardly upon said stem she will move the loosened valve structure radially outward from the conduit 25 to the position indicated in dotted lines in Fig. 2, thus clearing the valve chamber of all obstruction to the free flow of water therethrough from the basin 12 to the basin 14. This operation will be performed whenever it is desired to flush out ground up garbage contained in the garbage housing 20. In closing the valve the stem 50 will be pushed in to the limit of its longitudinal movement and will then be turned clockwise fully to seat the valve halves.

For the average family the device will save twenty to fifty gallons of water per day. Consequently it adds to the advantages resulting from the installation of mechanical garbage disposal units.

I claim:

1. In a sink, a first basin, a trap leading therefrom, a second basin located alongside said first basin, a garbage disposal housing in communication with and depending from said second basin, a trap leading from said housing, and conduit means leading from the lower portion of said first basin to the lower portion of said second basin to conduct used water from said first basin to said second basin thence to flow into said housing and flush the ground garbage therefrom.

2. The combination, with a double compartment sink comprising a pair of horizontally adjacent open-topped basins and a garbage disposal housing depending from and in communication with one of said basins; of a water passage means located between the bottom portions of said basins, a manually operable valve positioned in said water passage means and normally closing flow of water therethrough, and means operatively connected to said valve manually to open it to admit used water into said one basin from the other basin, to flush out the ground-up garbage from said housing.

3. The combination, with a double compartment sink comprising a pair of horizontally adjacent open-topped basins, a garbage disposal housing depending from and in communication with one of said basins, and a conduit connecting the bottom portions of said basins with each other, said conduit containing a valve chamber which forms a part of the fluid conducting passage thereof, said valve chamber in each of opposite sides having a valve port substantially in axial alinement with said conduit; of a valve closure comprising two halves which are movable away from each other to positions wherein they abut said ports and are movable toward each other to positions wherein they slightly recede from said ports, said halves having oppositely beveled inner faces directed toward each other, each of said inner faces being bordered on all sides by a rectangular rim portion of the half in which it is located, a follower located in the space between said rim portions of said halves and by said rim portions held against rotation, and said halves being in a non-rotatable relation to said valve casing, said follower having a limited interlocked movement in relation to said halves and having through it a screwthreaded bore which extends radially in relation to the axis of the aforesaid conduit, and a manually operable turnable and longitudinally movable stem having a screwthreaded portion in engagement with the screw threads of said bore, said stem having around it a collar forming flange and each of said halves having an arcuate groove loosely containing the part of said flange at its side of the structure, said stem being initially rotatable to cause said follower to move said halves from fully closed to slightly open positions and vice versa, when said halves are in their slightly open positions, outward sliding of said stem causing said collar thereof to move said valve closure halves radially away from the interior of said valve chamber so that liquid may flow therethrough in an unobstructed manner.

4. The combination, with a double compartment sink comprising a pair of horizontally adjacent open-topped basins, a garbage disposal housing depending from and in communication with one of said basins, and a conduit connecting the bottom portions of said basins with each other, said conduit containing a valve chamber which forms a part of the fluid conducting passage thereof, said valve chamber in each of opposite sides having a valve port substantially in axial alinement with said conduit; of a valve closure comprising two halves which are movable away from each other to positions wherein they abut said ports and are movable toward each other to positions wherein they slightly recede from said ports, said halves having oppositely beveled inner faces directed toward each other, a follower positioned between said faces and having cam portions to act upon them, said follower and halves being in a non-rotatable relation to said conduit, said follower having a limited, interlocked movement in relation to said halves and having through it a screwthreaded bore which extends radially in relation to the axis of the aforesaid conduit, and a manually operable turnable and longitudinally movable stem having a screwthreaded portion in engagement with the screw threads of said bore so that said stem may be initially turned to cause said follower to move said valve closure halves from fully closed to slightly open positions and vice versa, said stem being in an interlocked relation to said halves so that, when said halves are in their slightly open positions, said stem can be longitudinally moved to move said valve closure halves radially away from the interior of said valve casing so that liquid may flow therethrough in an unobstructed manner.

5. In a sink, a first basin, a second basin located alongside said first basin, a garbage disposal housing depending from and communicating with said second basin, a conduit leading from the lower portion of said first basin to the lower portion of said second basin, said conduit including a valve chamber with a pair of opposed ports both located axially of said conduit, a two part valve head located in said chamber, one part of said head normally abutting one of said ports while the other part thereof abuts the other of said ports, valve head expanding and contracting means located between said valve head parts and operable to move them to and from their said port abutting relations, and a valve stem in an operative relation to said valve head and to said expanding and contracting means, said stem, as a means for opening the valve, being turnable to contract said valve head and thereupon longitudinally movable to withdraw said valve head more or less from said valve chamber.

6. In a sink, a first basin, a second basin located alingside said first basin, a garbage disposal housing depending from and communicating with said second basin, a conduit means leading from the lower portion of said first basin to the lower portion of said second basin, a valve head located in said conduit means to open and close liquid flow therethrough, and means connected to said valve head and manually operable from a point in front of the sink to move said valve head from an open to a closed position and vice versa.

7. In a sink, a first basin, a second basin located alongside said first basin, a garbage disposal housing depending from and communicating with said second basin, a conduit means leading from the lower portion of said first basin to the lower portion of said second basin, a valve head located in said conduit means to open and close liquid flow therethrough, and means connected to said valve head and manually operable from a point in front of the sink to move said valve head from an open to a closed position and vice versa, said manually operable means comprising a valve operating stem with an outer end portion normally contained in an alcove therefor in the front portion of the sink.

MARTIN L. STAFFORD.

References Cited in the file of this patent

UNITED STATES PATENTS

| Number | Name | Date |
|---|---|---|
| 1,902,192 | Stoddard | Mar. 21, 1933 |
| 2,036,692 | Groeniger | Apr. 7, 1936 |